United States Patent [19]

Avetisian et al.

[11] Patent Number: 5,423,950
[45] Date of Patent: Jun. 13, 1995

[54] METHOD AND REACTOR FOR PRODUCING TIRE OIL

[75] Inventors: Vahan Avetisian, Burbank; Constantin Bugescu, La Habra Hts.; Robert S. Burton, III, Simi Valley; Craig J. Castagnoli, Rowland Heights; Suk-Bae Cha, Long Beach; Kenneth S. Lee, Rowland Heights; Allen M. Robin, Anaheim, all of Calif.

[73] Assignee: Texaco Inc., White Plains, N.Y.

[21] Appl. No.: 142,012

[22] Filed: Oct. 28, 1993

[51] Int. Cl.⁶ .................. C10B 1/04; C10B 47/14; C10B 53/00
[52] U.S. Cl. ............................. 201/3; 201/8; 201/10; 201/23; 201/25; 202/84; 202/121; 202/219; 202/261; 202/262; 585/241
[58] Field of Search ............ 202/84, 99, 105, 107, 202/121, 219, 226, 262, 261; 201/3, 8, 10, 23, 25, 34; 585/241; 196/14.52, 118; 422/274, 284; 48/92; 414/213

[56] References Cited

U.S. PATENT DOCUMENTS

| | | |
|---|---|---|
| 3,977,960 | 8/1976 | Stout ........................ 201/10 |
| 4,074,979 | 2/1978 | Kurisu et al. ............... 201/25 |
| 4,108,730 | 8/1978 | Chen et al. ................ 201/25 |
| 4,235,676 | 11/1980 | Chambers . |
| 4,258,011 | 3/1981 | Prazmowski ............... 422/274 |
| 4,474,524 | 10/1984 | Kawakami et al. . |
| 4,686,008 | 8/1987 | Gibson . |
| 5,037,628 | 8/1991 | Fader . |
| 5,070,109 | 12/1991 | Ulick et al. ................ 585/241 |
| 5,095,040 | 3/1992 | Ledford . |
| 5,129,995 | 7/1992 | Agarwal . |

FOREIGN PATENT DOCUMENTS

| | | | |
|---|---|---|---|
| 3313470 | 10/1984 | Germany ............... 585/241 |
| 100103 | 9/1976 | Japan .................... 201/25 |
| 2084182 | 4/1982 | United Kingdom .... 201/25 |

Primary Examiner—Joye L. Woodard
Attorney, Agent, or Firm—George J. Darsa; Harold J. Delhommer

[57] ABSTRACT

The reactor forms a chamber which contains the reaction process. There are accesses to the chamber for receiving shredded tires and oil. There are egresses from the chamber for discharging the tire oil and for discharging unreacted elements. Apparatus is located within the chamber which separates the unreacted components of the shredded tires from the tire oil. The apparatus also provides for the removal of the unreacted elements from the chamber means. The reactor also includes a heater which heats the inside of the chamber to a temperature sufficient to cause a reaction between the shredded tires and the oil.

4 Claims, 2 Drawing Sheets

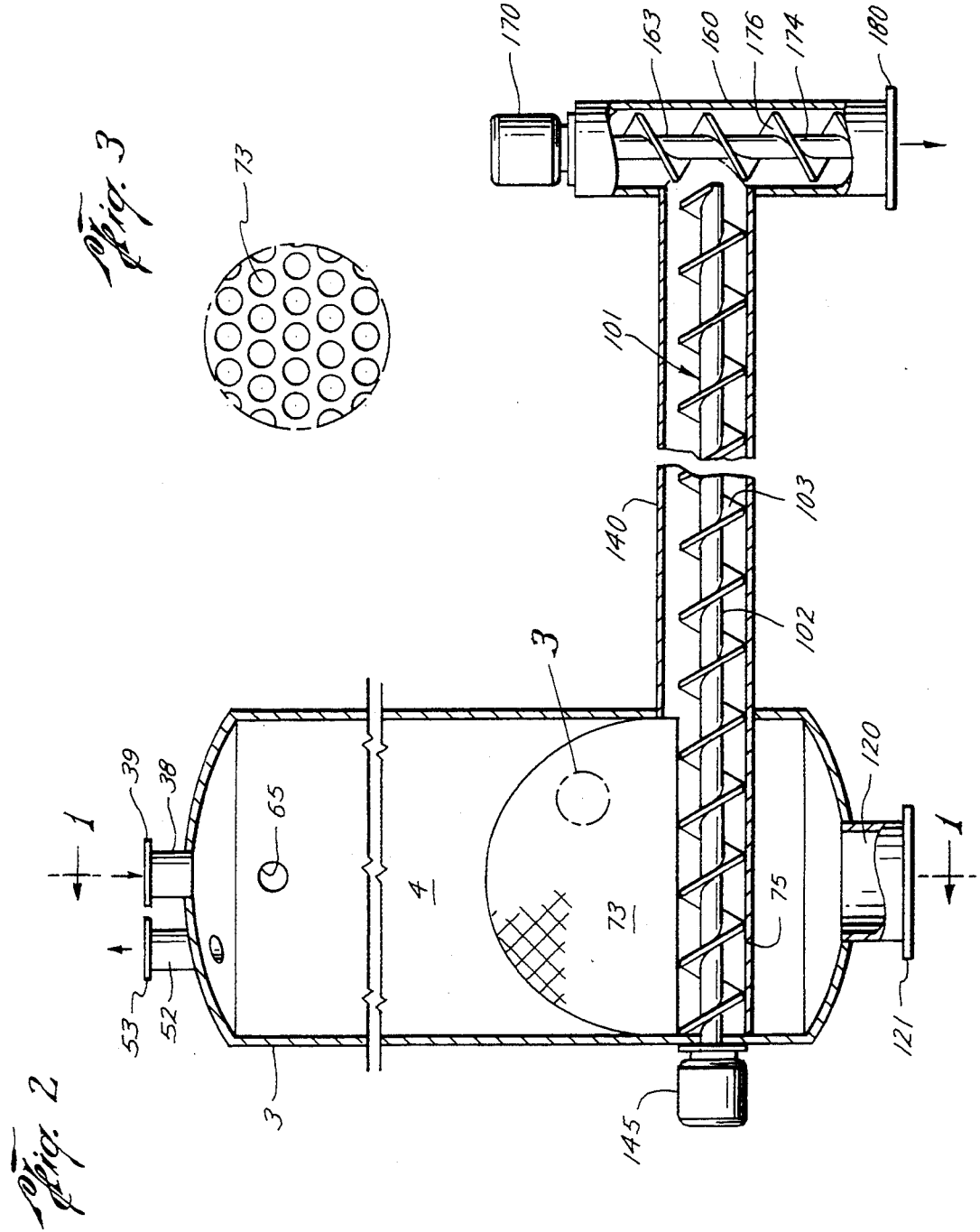

METHOD AND REACTOR FOR PRODUCING TIRE OIL

BACKGROUND OF THE INVENTION

FIELD OF THE INVENTION

The invention relates to reactors in general and, more particularly, a reactor for a tire liquefaction process in which shredded tires and oil are reacted together to provide tire oil.

SUMMARY OF THE INVENTION

The reactor forms a chamber which contains the reaction process. There are accesses to the chamber for receiving shredded tires and oil. There are egresses from the chamber for discharging the tire oil and for discharging unreacted elements. Apparatus is located within the chamber which separates the unreacted components of the shredded tires from the tire oil. The apparatus also provides for the removal of the unreacted elements from the chamber means. The reactor also includes a heater which heats the inside of the chamber to a temperature sufficient to cause a reaction between the shredded tires and the oil.

The objects and advantages of the invention will appear more fully hereinafter, from a consideration of the detailed description which follows, taken together with the accompanying drawings, wherein one embodiment is illustrated by way of example. It is to be expressly understood, however, that the drawings are for illustrative purposes only and not to be construed as defining the limits of the invention.

DESCRIPTION OF THE DRAWINGS

FIG. 2 is a diagrammatic central section view taken along line 2—2 of FIG. 1.

FIG. 3 is a cut away representative of the screens mounted internally in the reactor.

DESCRIPTION OF THE INVENTION

Figure 1:
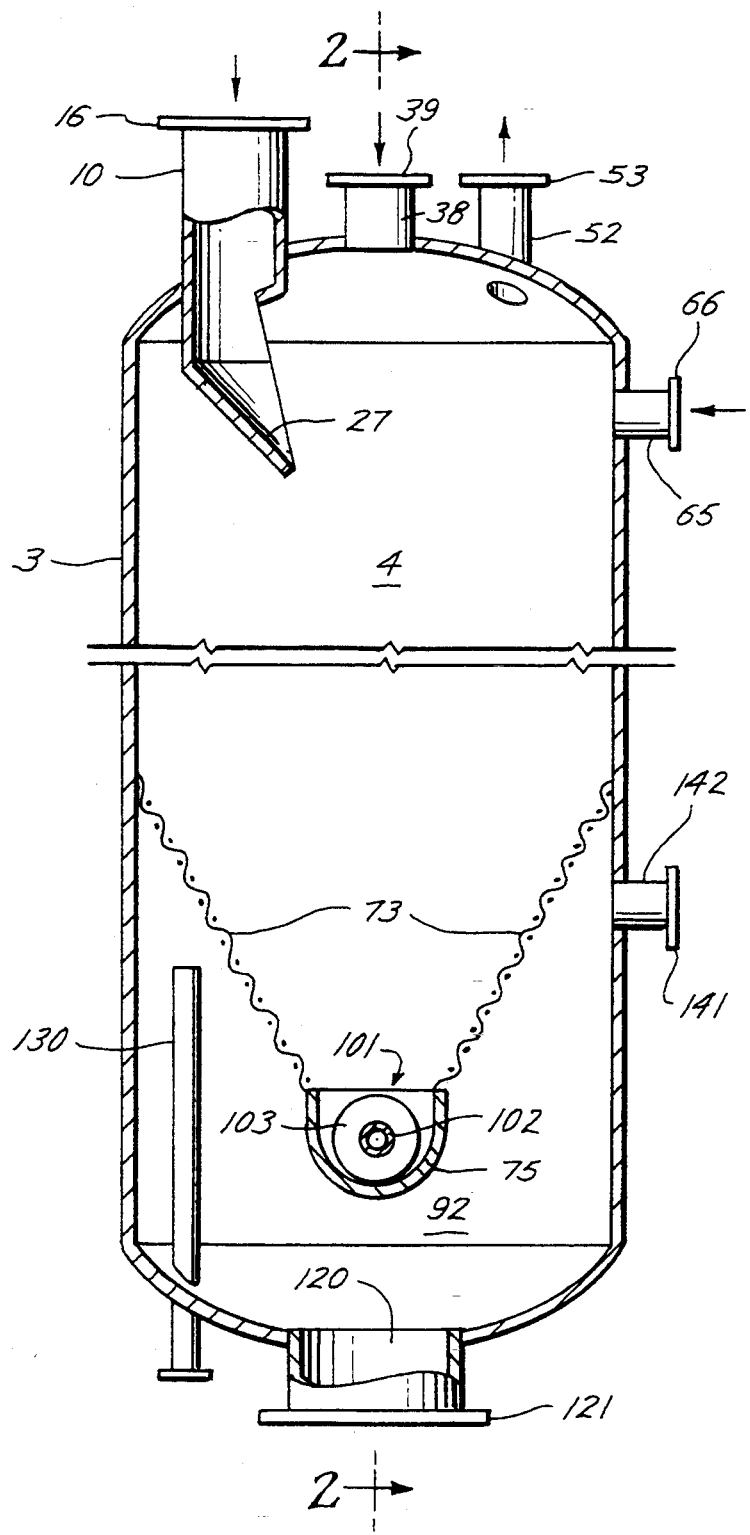
FIG. 1 is a diagrammatic central section view of a reactor, constructed in accordance with the present invention, taken along the line 1—1 of FIG. 2.

Shown in FIGS. 1 and 2 is a reactor 3 which is used to react tires and liquid oil, generally in the form of waste oil, to convert the non-metal components of the shredded tires to tire oil in a process described and disclosed in application Ser. No. 08/053,727, filed Apr. 22, 1993, now U.S. Pat. No. 5,364,996. Many of the shredded tires, if not all of the shredded tires, will have pieces of metal in them, either from the steel belt, in the steel belted radial-type tires, or from the beading around the edge of the tires. These metal components, as well as some other components, are not converted to tire oil.

Reactor 3 has an entrance port 10 with flanged portion for connections to other pipes 16. Also associated with port 10 is a deflection plate 27 so that as the shredded tires entering reactor 3 they are directed towards the center of a chamber 4 within reactor 3. Also shown is a port 38 with a flanged connection 39 for the insertion of a mixer which is used to mix the shredded tire and oil. Another port 52 with a flange connection 53 is used to draw off any gas that develops in the process.

Further, there is shown an injection port 65 with flange connection 66 where oil used in the reaction process is injected into chamber 4. Internally, a portion of chamber 4 is formed by two screens 73. Also connecting screens 73 to each other is a bottom element 75, which completes the formation of chamber 4 in cooperation with portions of reactor 3. It also forms another chamber 92 in cooperation with reactor 3 and screens 73.

Screens 73 are made of plate metal. FIG. 3 shows a cut away portion of screen 73 to the hole arrangement. In one example, each hole is approximately ½ inch in diameter.

Returning to chamber 4, there is also located within chamber 4 screw auger means 101 having a shaft 102 with a spiral wound blade 103. Screw auger means 101 will be described more fully hereinafter along with it cooperation with screens 73 and bottom element 75.

Also shown in FIG. 1 is a bottom port 120 with a flange connecting 121. Further, there is shown as entering into chamber 92, a conventional-type emersion heater 130. Shown is a draw-off 142 with a flange connection 141.

Connected to chamber 3 is a horizontal conduit 140 and auger screw means 101 extends through it. Motor means 145 rotates auger screw means 101 so as to move the metal that has separated from the tire shreds out of chamber 3 for discharge. The metal is carried along conduit 140 by auger screw means 101 until it encounters a vertical conduit 160 having a vertically arranged auger screw means 163. Auger screw means 163 is rotated by a motor 170. Auger screw means 163 like auger screw means 101 has a shaft 174 with a spiral blade 176. Auger screw means 163 extends to the end of conduit 160 which has a mounted flange 180. Material carried from chamber 3 is discharged from the system through conduit 160.

What is claimed is:

1. A tire oil reaction method which reacts shredded tires and oil to produce tire oil comprising the steps of:
   introducing shredded tires into a reactor;
   introducing oil into the reactor;
   heating the inside of the reactor to a temperature sufficient to cause a reaction between the shredded tires and the oil to produce tire oil;
   separating unreacted components of the shredded tires from the tire oil within the reactor;
   discharging the tire oil from the reactor; and
   removing the unreacted components from the reactor by using a first screw auger means in a substantially horizontal first conduit means to move the unreacted components from the reactor through the first conduit means and through a substantially vertical second conduit means connected to the first conduit means and containing a second screw auger means.

2. A tire oil reactor which reacts shredded tires and oil to produce tire oil, comprising:
   (a) a reactor chamber having first inlet means for receiving shredded tires and second inlet means for receiving oil;
   (b) heating means for heating the inside of the reactor chamber to a temperature sufficient to cause a reaction between the shredded tires and the oil to produce tire oil;
   (c) separating means located within the reactor chamber for separating unreacted components of the shredded tires from the tire oil;
   (d) discharge means for discharging the tire oil from the reactor chamber; and (e) removal means for removing the unreacted components from the reactor chamber, which comprises
- a substantially horizontal first conduit means affixed to the reactor chamber;
- a substantially vertical second conduit means connected to the first conduit means;
- a first screw auger means, having a first portion located within the reactor chamber and the remaining portion within the first conduit means, for moving the unreacted components from the reactor chamber through the first conduit to the second conduit; and
- a first motor means connected to the first screw auger means for driving the first screw auger means so as to remove unreacted components from the reactor chamber;
- a second screw auger means located within the second conduit means for preventing binding of the unreacted components exiting the first conduit means and for moving the unreacted components so as to discharge the unreacted components; and
- a second motor means connected to the second screw auger means for driving the second screw auger means.

3. A reactor as described in claim 2 wherein the separating means includes a pair of screens located within the reactor chamber at a predetermined angle with the vertical to facilitate the movement of the unreacted components down the screens, and a bottom element connecting said screens with the first portion of the first screw auger means located above the bottom element for moving the unreacted components from the reactor chamber while the tire oil passes through the screens to the discharge means.

4. A reactor as described in claim 3 wherein the screens are metal plates having holes of a predetermined diameter drilled in a predetermined arrangement so as to facilitate the passage of the tire oil through the screens while preventing the unreacted components from passing through.

* * * * *